United States Patent Office 3,462,578
Patented Aug. 19, 1969

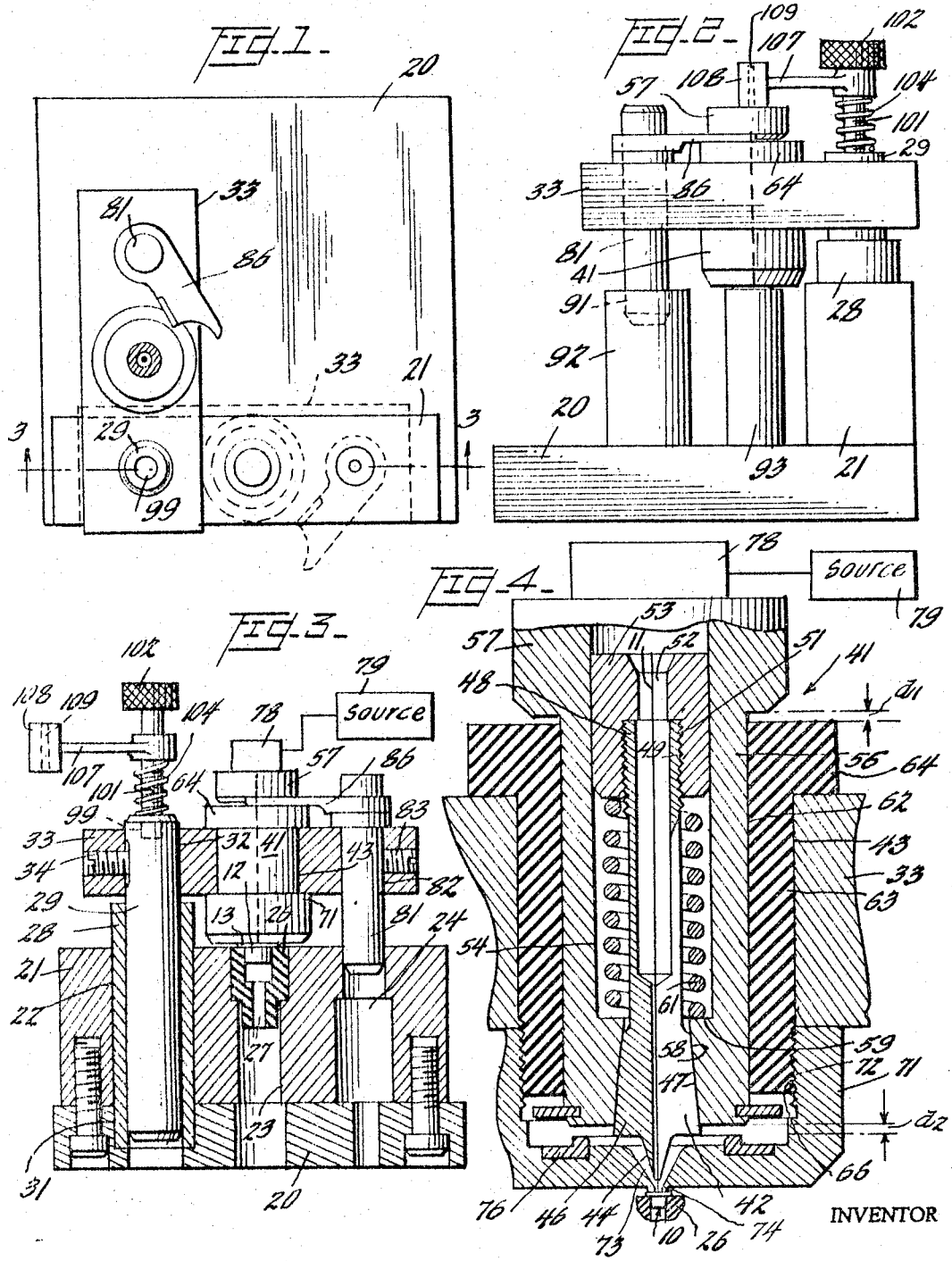

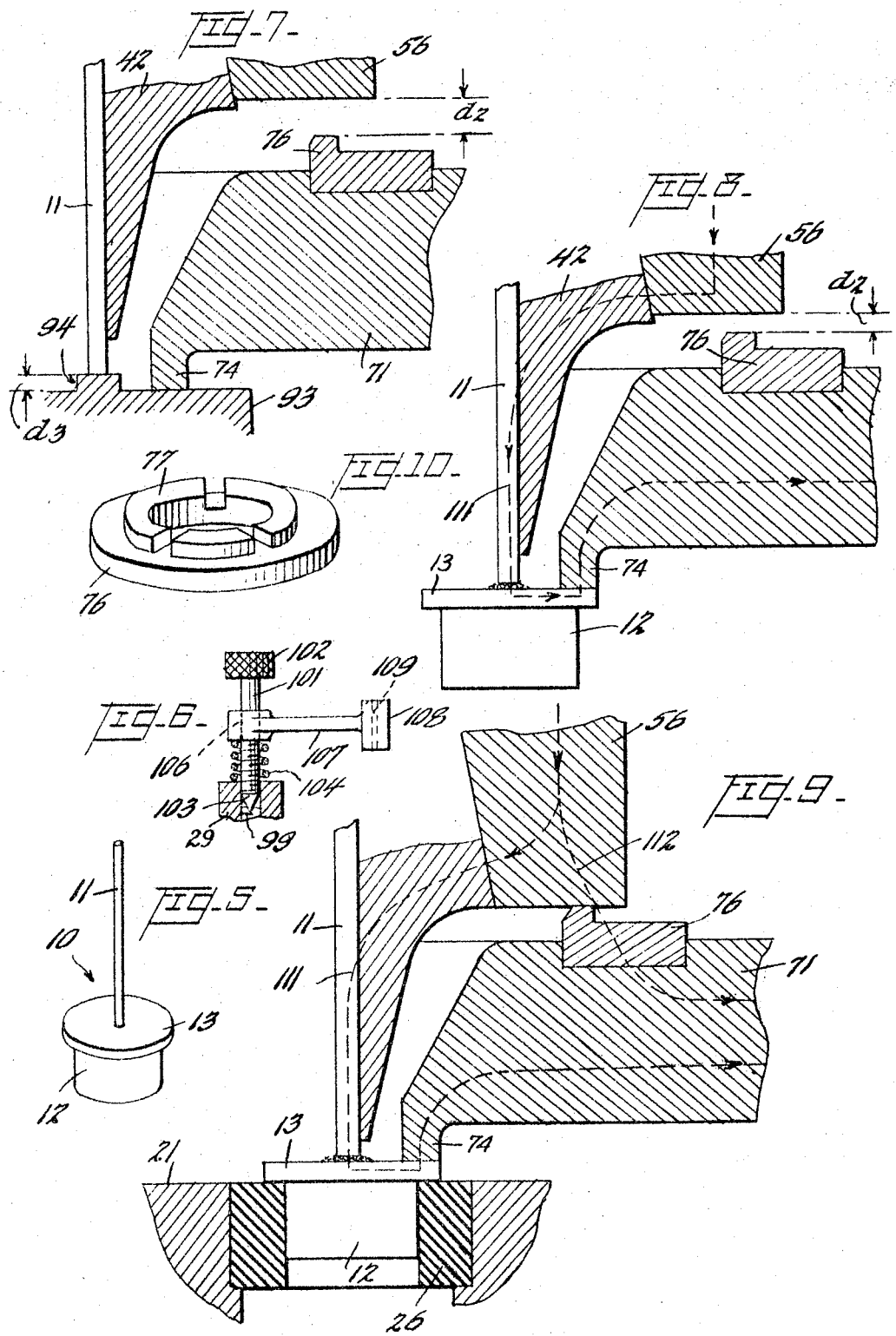

3,462,578
CONTROLLED CURRENT WELDING APPARATUS
AND METHOD
Quentin L. Schmick, Wyomissing, Pa., assignor to Western
Electric Company, Incorporated, New York, N.Y., a
corporation of New York
Filed Nov. 15, 1965, Ser. No. 507,897
Int. Cl. B23k 11/04
U.S. Cl. 219—103               14 Claims

ABSTRACT OF THE DISCLOSURE

A wire lead is inserted in an upper electrode and extends through a central aperture of a second lower electrode concentrically disposed about the first electrode. The electrodes are moved to a weld position to support the second electrode against a base stud to which the wire lead is to be welded. The first electrode is supported and spaced a predetermined distance above the second electrode by the wire lead engaging the base stud. Welding current is applied through the electrodes and wire to heat and melt the wire whereupon the first electrode drops through the distance to engage the second electrode and shunt most of the current around the weld to slowly cool and anneal the weld.

---

This invention relates to a controlled current welding apparatus and method, and more particularly, to an improved apparatus and method for electrically welding together two members with provisions for controlling the current in accordance with relative movement between the members to effectuate a cooling of the weld.

In many electrical resistance welding operations of metal, electrical devices and components, there is a problem of damaging the devices by heat exceeding a predetermined critical value. If the welding current through a wire lead and base stud assembly of a diode, for example, is not controlled, an excessive heating of the wire lead will result in a deficient weld joint or damage to the diode assembly. It has been found that by reducing the current through the welded joint in the latter phase of the welding operation, and thus allowing a slower cooling of the weld, a desirable annealing action results. In the past, current control has been accomplished in alternating current welding circuits by employing an R-C circuit which was selected to reduce the amount of current after a given number of cycles of application of the alternating current. A further problem is encountered in the welding of leads of a specific length to semiconductors or to other miniature devices due to the melting or excessive burn-off of the end of the lead abutting the semiconductor, for example, with a subsequent, and in most cases, an uncontrollable reduction in length.

An object of this invention relates to a new and improved controlled current welding apparatus and method.

A further object is to provide a new and improved welding apparatus that can be used to align and weld together two parts with means to prevent damage to the parts by the heat exceeding a predetermined critical value.

Another object of this invention is to provide a welding apparatus with provision to preset the amount of material to be melted from one of the workpieces to form the weld joint.

A still further object of this invention is to provide an improved method and apparatus for aligning and welding a wire-like member to a base member wherein a welding current is reduced to anneal the weld after a predetermined length of the wire-like member is rendered molten to provide the weld material.

An additional object of this invention is to provide a method and apparatus for aligning and welding two component parts whereafter part of the welding current is shunted from the weld juncture upon a predetermined amount of material of one of the parts being puddled.

With these and other objects in view, the present invention contemplates an apparatus and method employing facilities for gripping and moving a pair of members relative to each other to establish an initial contact during which a first welding current is passed through the members to melt one or both of the members to permit further movement between the members whereafter the welding current is reduced to prevent excessive melting and to cool the weld joint. More specifically, a wire-like member is placed in a collet chuck in a first or loading position, and a predetermined length of the member is positioned to extend from the chuck. The chuck is pivotally moved into a second or welding position so that the wire-like member extending from the chuck is positioned above and in contact with a base stud held in a cavity of a bed block. A first electrode concentrically disposed about the collet is then brought into contact with the chuck and current is passed through the wire-like member to the base stud and a second fixed electrode supported on the base stud. As a predetermined amount of the wire-like member melts to form a puddle of weld material, the collet chuck and first electrode moves a predetermined distance toward the base stud whereupon current is shunted from the weld juncture to reduce the temperature to prevent further burn-off of the lead, and thereafter anneal the weld.

Other objects and advantages of the present invention will be apparent from the following detailed description when considered in conjunction with the accompanying drawings wherein:

FIG. 1 is a plan view of the welding apparatus embodying the principles of the present invention, showing a pivotally mounted welding fixture that may be pivoted to move a collet chuck from the illustrated, solid-lined, loading position to the illustrated, dashed-lined, weld position;

FIG. 2 is an elevational view of the pivotally mounted member in the loading position with the jaws of the collet chuck opened to receive a wire lead;

FIG. 3 is a sectional view taken along line 3—3 of FIG. 1 showing the collet chuck in the weld position with the wire lead aligned and in contact with a base stud positioned in a bed block;

FIG. 4 is an enlarged sectional view of the collet chuck and electrode assembly, particularly showing the relationship of a shunting means to other elements of the assembly when in the weld position;

FIG. 5 is a perspective view of a completed diode assembly for which the apparatus of the present invention is used to weld the wire lead to the base stud;

FIG. 6 is an elevational view of an assembly used to open the jaws of the chuck during the loading operation;

FIGS. 7–9 are simplified sectional views of the apparatus illustrating the loading, welding, and annealing steps embodying the principles of the method of practicing the invention; and FIG. 10 is a detailed view of the shunting means.

Referring to FIG. 1 there is shown a pivotally mounted welding apparatus used in the fabrication of an article such as a diode 10 (see FIG. 5) wherein a wire lead 11 is welded to a base stud 12. The base stud 12 includes an electrically conductive housing having a flanged end 13.

Attention is directed to FIGS. 1 and 3 wherein the welding apparatus is shown as being mounted on a base plate 20 on which is secured a rectangular block 21 having a cylindrical bore 22 and stepped bores 23 and 24. An insert 26 composed of electrically insulative material and having a stepped cavity 27, is positioned in stepped bore 23 and receives the base stud 12 so that the flange 13 of the base stud 12 extends over and rests on the top surface of the block 21.

A bearing sleeve 28 is positioned in bore 22 and rotatably supports a vertical shaft 29. The upper end of the shaft 29 extends through a bore 32 formed in a support arm 33, and is secured to the arm by a set screw 34.

Referring to FIGS. 3 and 4, there is shown a collet chuck 41 mounted in a cylindrical bore 43 in the support arm 33 for gripping and holding a wire lead 11 in abutting relation to the flange 13 of a base stud 12 positioned in the cavity 27 of the insert 26 in the block 21. The collet chuck 41 has a plurality of spring jaws 42 which extend through and project beyond the bore 43 in the support arm 33. The lower end of each spring jaw is formed with a flared tip 44 which extends from an enlarged portion 46 of the jaw. The enlarged lower portions 46 of the jaws 42 have bevelled outer surfaces 47.

The upper ends of the spring jaws 42 terminate in a common ring 48 having threads 49 externally formed thereon. The ring 48 is threadably secured in a threaded bore 51 of a stepped passageway 52 formed in an actuating nut 53. The actuating nut 53 is slidably mounted in a stepped bore 54 of an electrically conductive plunger 56 having a headed end 57. The lower stepped portion 58 of the bore 54 of the plunger 56 is tapered to cooperate with the bevelled outer surfaces 47 of the jaws 42. The stepped portion 58 forms an annular ledge 59 against which bears one end of a compression spring 61 that is concentrically disposed about the spring jaws 42. The upper end of this spring 61 bears against the actuating nut 53 to force the jaws 42 upwardly and cam the bevelled surfaces 47 against the tapered bore 58 to maintain the jaws in a normally closed position.

The conducting plunger 56 is slidably mounted in a bore 62 of a cylinder 63 of insulating material which insulates the plunger 56 from the support arm 33. The cylinder 63 is formed with an insulating flange 64 on its upper end that rests on the top surface of the arm 33 and supports the collet 41 within the bore 43. The lower end of the cylinder 63 is formed with external threads that extend beyond the underside of the arm 33.

A cup-shaped lower electrode 71 having a threaded cavity 72 is mounted on the threads 66 of the cylinder 63, with the top of the electrode 71 abutting the underside of the support arm 33 to lock the collet chuck 41 within the bore 43. The bottom of the cavity 72 in the lower electrode 71 is formed with an aperture 73 to permit the end of a wire lead 11 gripped by the jaws 42 to protrude therethrough to abut the flange 13 of the base stud 12. The peripheral edge of the aperture 73 on the outside bottom of the electrode 71 is turned downward to form an annular lip 74 extending toward the base stud 12. When the apparatus is in the welding position shown in FIGS. 3 and 4, the lip 74 of the electrode 71 bears against the top flange 13 of the stud 12 to support the collet chuck 41 and the arm 33. When the conducting plunger 56 moves downwardly during the welding operation, the bottom annular surface of the plunger 56 contacts an electrically conductive ring 76 protruding upward from a circular recess formed in the bottom of the lower electrode 71.

Various modifications could be made to the conducting ring 76 and not depart from the scope of the invention. The top annular surface of the ring 76 could be formed with a narrowed annular area 77 (see FIG. 10) that would offer a higher resistance and reduce the amount of current directed through the conductive ring 76. Also, it is to be understood that the conductive ring 76 need not be a continuous member. The narrowed annular area 77 could be formed in three segments, for example, equally spaced about the periphery of a circle.

In addition, the conductive ring 76 could be composed of a material having a negative coefficient of resistance. As the temperature of the ring 76 rises after the plunger 56 contacts the conductive ring 76, the negative resistance character of the material allows a gradual increase in the amount of current diverted. This will be accompanied by a gradual lowering of the temperature of the wire lead 11 and base 12 and the subsequent solidification of the weld.

An upper electrode 78 is mounted for movement into contact with the headed end 57 of the plunger 56. The upper and lower electrodes 78 and 71 respectively are connected to any commercial source of welding current 79, and together with the plunger 56 and jaws 42 form a primary path 111 of current (see FIG. 8). A normally open shunt circuit 112 (see FIG. 9) includes the conducting plunger 56, the lower electrode 71, and the conductive ring 76 protruding upward from the inside bottom of the lower electrode 71. The shunt circuit 112 is closed when the conducting plunger 56 moves downward to engage the ring 76 (see FIG. 9).

Referring now to FIGS. 2 and 3, there is shown a locator pin 81 mounted in a bore 82 formed in the support arm 33 and secured to the arm by a set screw 83. The bottom of the pin 81 extends toward, and is aligned with, the stepped bore 24 in the bed block 21. The top of the pin 81 extends above the top of the arm 33 to pivotally support a laterally extending bar 86. During the initial loading of a lead 11, the bar 86 is swung to position the free end thereof between the top of the flange 64 and the bottom of the headed end 57 of the plunger 56 (see FIGS. 2 and 3), whereupon the top of the plunger 56 is raised above the flange 64 a distance $d_1$, which, during the loading operation, is equal to the thickness of the bar 86. This, in turn, raises the bottom of the plunger 56 a distance $d_2$ above the conductive ring 76. The distance $d_1$ is always greater than the distance $d_2$.

Attention is directed to FIGS. 1 and 2, which show the arm 33 pivotally moved into a loading position. The locating pin 81 is then inserted into a shallow cavity 91 in the top of a post 92 to align the collet chuck 41 with a height gauging pin 93 (see FIGS. 2 and 7) having a centrally located protrusion 94 that projects above the top of the pin 93 a distance $d_3$. When the lip 74 of lower electrode 71 rests against the top surface of the gauging pin 93, the end of a wire lead 11 inserted in the collet chuck 41 will abut the protrusion 94 (see FIG. 7). The distance $d_3$ is less than the distance $d_2$ during the loading operation (see FIG. 7) and is sized in accordance with the length of wire lead 11 to be melted.

Referring to FIGS. 2 and 6, where the arm 33 is in the loading position, facilities are provided to open the jaws of the collet chuck. These facilities include a vertical rod 101 having a knurled head 102 and a threaded end 103 that is mounted in a threaded bore 99 formed in the top of the vertical shaft 29. The rod 101 extends through a bore 106 in a laterally extending arm 107 to rotatably and slidably support the arm. The arm 107 has an enlarged free end 108 having a passageway 109 formed therethrough. A compression spring 104 is concentrically disposed about the rod 101 between the arm 107 and the top of the vertical shaft 29.

When the arm 107 is swung into a position over the support arm 33, the enlarged end 108 is aligned with the collet chuck 41. The enlarged end 108 is subsequently advanced to engage the actuating nut 53 and move the nut downward to open the jaws 42 of the chuck 41.

OPERATION

In the overall operation of the apparatus, attention is first directed to FIGS. 1 and 2. Initially, an attending operator will move the support arm 33 into the loading position as shown in solid lines in FIG. 1, for purposes of loading the wire lead 11 into the collet chuck 41. The locator pin 81 projecting from the underside of the arm 33 is inserted into the cavity 91 in the top of the post 92 to align the collet chuck 41 with the gauging pin 93. The arm 33 is supported by the lip 74 of the lower electrode 71 bearing against the top of the gauging pin 93. An operator slidably moves the conducting plunger 56 in an upward direction, and simultaneously pivots the bar 86 to position the bar between the flange 64 of the cylinder 63 of insulation and the headed end 57 of the conducting plunger 56. The operator releases the plunger 56 whereupon the plunger is supported on the bar 86.

The operator then pivotally moves the horizontal arm 107 to align the passageway 109 in the enlarged end 108 with the collet chuck 41, and at the same time turns the knurled head 102 of the rod 101 to threadably advance the rod into a threaded bore 99 in the top of the vertical shaft 29 as shown in FIGS. 2 and 6. The head 102 applies a downward force to the arm 107 against the upward bias of the spring 104. The laterally extending arm 107 transmits this downward force to seat the enlarged end 108 in the bore 54 of the conducting plunger 56 above the actuating nut 53 of the collet chuck 41.

The operator next turns the knurled head 102 to further advance the threaded end 103 of the rod 101 into the vertical shaft 29, whereupon the enlarged end 108 applies a force to the top of the actuating nut 53 shown in FIG. 4. The actuating nut 53 is moved downwardly against the action of the compression spring 61, and the bevelled surface 47 of each collet jaw 42 moves downward along the corresponding tapered surface 58 of the conducting plunger 56 allowing the spring biased jaws 42 to open.

The next step of the method of loading is to drop a wire lead 11 through the passageway 109 into the opened collet chuck 41, with the lead 11 coming to rest againt the protrusion 94 of the gauging pin 93 as shown in FIG. 7. The operator turns the knurled head 102 of the rod 101 in the opposite direction, whereupon the arm 107 is biased upward by the spring 104. The enlarged end 108 moves upward with the arm 107, out of engagement with the actuating nut 53. The compression spring 61 in the collet chuck 41 forces the actuating nut 53 and the jaws 42 upwardly, to cam the bevelled surfaces 47 of the spring jaws 42 against the tapered bore 58 of the conducting plunger 56 to close the chuck 41 and grasp the wire lead 11. The enlarged end 108 is moved far enough in an upward direction out of contact with the actuating nut 53 so that the arm 107 may be swung through a quarter turn away from the top plane of the arm 33 to the position shown in FIG. 3.

The operator then lifts the arm 33 to retract the locator pin 81 from the opening 91 in the top of the post 92, and pivots the arm 33 about the vertical shaft 29 through a quarter turn in a clockwise direction until the locator pin 81 is over the stepped bore 24 in the bed block 21. The arm 33 is allowed to descend until the locator pin 81 is inserted in the stepped bore 24, and the downwardly turned lip 74 of the lower electrode 71 contacts the top peripheral edge of the flange 13 of the base stud 12 positioned in insert 26 in the bed block 21 to support the arm 33. The arm 33 supports the insulating cylinder 63 by the flange 64, and the bar 86 resting on the flange 64, which in turn supports the collet chuck 41 and the conductive plunger 56 as shown in FIGS. 4 and 8. With the arm 33 now aligned over the bed block 21, the wire lead 11 is in contact with the flange 13 of the base stud 12.

Next, the bar 86 is pivoted away from the collet chuck to leave a space $d_2$ between the bottom of the conductive plunger 56 and the top of the conductive ring 76. The collet chuck 41 and the conductive plunger 56 are prevented from dropping downward by the wire lead 11 bearing against the base stud 12. In this position, the distance $d_2$ will be equal to the length of wire lead 11 to be melted.

The upper electrode 78 is then brought into contact with the top of the conducting plunger 56 and a welding current from the source 79 is applied thereto. The welding current flows along the primary path 111 from the upper electrode 78 through the conducting plunger 56 and jaws 42 to the lead 11 and base stud 12 and thence up through the lower electrode 71 (see FIG. 8). As the welding current flows through the lead 11, the tip of the lead is melted to form a puddle of weld metal on top of the flange 13 of the base stud 12, whereupon the collet chuck 41 and conducting plunger 56 drop through the distance $d_2$, which is also equal to the amount of wire melted. The downward advance of the collet chuck 41 and conducting plunger 56 is arrested by the conducting plunger 56 engaging the top of the ring 76 protruding from the lower electrode 71 (see FIG. 9), whereupon the normally open shunt circuit 112 is closed to divert a substantial portion of the welding current from the juncture between the wire 11 and the base stud 12. The amount of current which is diverted is sufficient to allow the melt to solidify. Then solidification is accomplished by a reduction of temperature of the weld to permit annealing of the weld.

The welding time may be increased or decreased by changing the thickness of the bar 86 which, in turn, will change the distance $d_2$ through which the plunger 56 must drop before engaging the protruding conductive ring 76.

The wire and stud assembly may be removed from the welding apparatus by first rotating the arm 107 to engage the enlarged end 108 with the actuating nut 53 to open the jaws 42 of the chuck 41 to release the wire 11. The operator then moves the arm 33 vertically until the bottom of the jaws 42 has cleared the top of the wire lead 11 at which time the base stud 12 is removed from the insert 26 in the bed block 21.

It is to be understood that the above-identified embodiment is simply illustrative of the principles of the invention, and numerous other modifications may be devised without departing from the spirit and scope of the invention.

What is claimed is:

1. A method of controlled welding of a fusible first part to a second part;

holding said fusible first part within a pair of spaced electrodes, said spaced electrodes being movable relative to each other;

supporting the fusible first part and one of said electrodes on said second part to form a circuit through said electrodes and said parts;

passing welding current through said circuit to heat and melt said first part and thus further advance the first part toward the second part and the other of said electrodes toward said one of said electrodes;

arresting the first part after a predetermined advance; and simultaneously therewith diverting a sufficient portion of the welding current from said other of said electrodes through said one of said electrodes to cool the melt.

2. A method of controlled welding of a fusible part with a second part as defined in claim 1 which includes the steps of:

gradually reducing the current flow through the first and second parts, while simultaneously increasing the amount of diverted current.

3. A method of electrical resistance welding and annealing wherein a first and second electrode means hold an elongated first member and a base means holds a second member, including the steps of:

moving the first and second electrodes toward the base means to engage the elongated first member with the second member and engage the second electrode with the second member;

applying electric current to the electrodes to melt the elongated member whereupon the elongated member and first electrode advance toward the second member; and engaging the first electrode with the second electrode after a predetermined movement to divert part of the current around the juncture of the weld and through said first and second electrodes and thereupon gradually reduce the weld temperature to anneal the weld at said juncture between the elongated first member and the second member.

4. A method of controlling the magnitude of a welding current flowing from a first electrode through a fusible wire and a part held in alignment therewith to a second electrode, said method including the steps of:

gripping a section of the wire with the first electrode with a predetermined length of the wire extending therefrom;

imparting a relative movement between the wire and the part to abut the wire and the part;

applying a welding current to the wire and the part to melt the length of the wire extending from the first electrode and further advance the wire and the first electrode toward the part;

arresting the advance of the first electrode to close a normally open shunt circuit between the first and second electrodes; and gradually diverting part of the current from the juncture between the fusible wire and the part to lower the temperature of the wire and the part and solidify the weld.

5. In an apparatus for welding a first member to a second member;

a base for supporting the second member;

first and second electrodes spaced from said base having facilities for gripping the first member;

means for holding the two members in alignment with one another;

means for advancing the two members relative to one another to establish an initial contact between the two members and for engaging the second member with the second electrode;

means for applying a welding current through the electrodes, holding means and the two members to melt at least one of the members to form a welded joint whereupon the two members move closer to one another; and means formed on said first and second electrodes and responsive to the further movement of the two members toward each other for gradually reducing the welding current through the members to reduce the temperature of the welded joint and solidify the weld.

6. In a device for welding a fusible wire onto a part:

first electrode means for gripping a section of wire with a length of the wire projecting from the gripping means;

second electrode means concentrically disposed about said first electrode means and having an aperture formed in the lower portion thereof for receiving the projecting end of said wire;

means for advancing the first and second electrode means toward the part to abut the wire and second electrode means against said part whereupon said second electrode means is supported by the part;

means for applying welding current through the first electrode means, the wire, the part and the second electrode means to melt the wire and further advance the first electrode means toward the part; and means connected to said second electrode and spaced a predetermined distance from said first electrode means for engaging the first electrode after the further advance of the first electrode means through said predetermined distance to divert a portion of the welding current from passage through the wire and part.

7. In a device for welding a fusible wire onto a part as defined in claim 6, wherein:

said diverting means is a conducting ring mounted on said second electrode means.

8. In a device for welding a fusible wire onto a part as defined in claim 7, wherein:

said conducting ring is composed of a material having a negative coefficient of resistance to gradually reduce the welding current.

9. In an electric welding and annealing apparatus:

a movably mounted collet chuck which grips a wirelike lead;

an upper electrode mounted on said collet chuck;

a base member for holding an article in abutment with the lead to support said collet chuck and said upper electrode;

a lower electrode engaging said article, said lower electrode having a protrusion spaced a predetermined distance from and in alignment with the upper electrode and forming a normally open shunt circuit therewith; and means for applying a welding current through the upper electrode and collet to melt and weld the end of the lead in abutment with the article whereupon the upper electrode and collet drop through the predetermined distance and the upper electrode engages the protrusion to shunt the current and cool the weld.

10. In an electric welding and annealing apparatus:

an upper first electrode;

a collet supported on said first electrode with an opening extending therethrough in which is positioned a wire lead;

a base member for holding a workpiece in alignment with said lead;

means for closing the collet to grip the lead in the collet with a predetermined length of said lead protruding therefrom into engagement with the workpiece;

a second electrode concentrically disposed about said collet and extending into contact with the workpiece to support said second electrode on said workpiece a predetermined spacing below said first electrode;

means for applying an electric current through said first electrode and lead to the workpiece and second electrode to melt the end of the lead in engagement with said workpiece and drop said first electrode through said predetermined spacing;

a normally open shunt circuit including said first electrode and said second electrode; and means integral with said second electrode and projecting toward said first electrode for closing said normally open shunt circuit to divert a part of the current from the lead and the workpiece to anneal the weld.

11. In an apparatus for electrically welding a wire lead to a workpiece:

an upper member;

a lower member having a cavity in which is positioned the workpiece;

a collet movably mounted in said upper member having an opening therethrough for receiving and positioning a lead in abutment with said workpiece;

means for closing the collet to grip the lead in the collet;

a first electrode for engagement and movement with said collet;

a second electrode mounted on the upper member for engaging the workpiece to support the upper member;

means for insulating said second electrode from said first electrode;

a protuberance projecting from the second electrode in the path of movement of said first electrode;

a normally open shunt circuit including the protuberance and the first electrode; and means for applying a welding current to the first electrode through the collet and lead and the workpiece to the second electrode to melt the end of the lead in contact with the workpiece whereupon the collet and first electrode move downwardly, said first electrode engaging the protuberance projecting from the second electrode to close the shunt circuit and divert part of the current from the lead.

12. In an apparatus for electrically welding an elongated member to a workpiece:

a vertically movable upper member having first and second ends, pivotally mounted at the first end for movement from a first loading position to a second welding position;

a locator pin projecting from the second end of the upper member;

a collet chuck mounted in said upper member for holding an elongated member;

a pin positioned beneath and aligned with said collet chuck when said chuck is in the first position for gauging the extension of the elongated member from said chuck;

a bed block having a cavity for receiving a workpiece, and a hole for receiving the locator pin;

an upper electrode in contact and movable with said chuck;

means for vertically moving the upper member to disengage the elongated member from the gauging pin and to pivot the upper member from the first position to the second position to engage the locator pin with the hole in the bed block and thus align the upper member with the bed block whereupon the elongated member is in abutment with the workpiece to support the chuck and the first electrode;

a lower electrode fixedly attached to the upper member for engaging the workpiece to support the upper member;

means for insulating said lower electrode from said upper electrode;

a protuberance projecting from the lower electrode and spaced a predetermined distance from the upper electrode;

a normally open shunt circuit including the protuberance and the upper electrode; and means for applying a welding current through the electrodes to melt the end of the elongated member in contact with the workpiece whereupon the first electrode drops through the predetermined distance and is arrested by the protuberance to close the shunt circuit and reduce the welding current.

13. In an apparatus for controllably forming an electric weld between the first and second part:

a collet slidably mounted for movement between a first and a second position for gripping the first part with a predetermined length of the first part protruding below the collet;

an electrode insulated from said collet when said collet is in the first position to form an open shunt circuit, said electrode having a central aperture formed therethrough with a conducting ring disposed about said aperture and extending towards said collet and having a lip about said aperture extending away from said collet;

means for holding said second part whereafter means for moving said collet to engage the lip of said electrode and the protruding end of the first part extending through said aperture with said second part to form an electrical circuit from said collet through said second part to said electrode;

means for applying potential between said collet and electrode to impart a current flow in said electrical circuit and melt the protruding end of the first part to move said collet to the second position into engagement with said ring to close the shunt circuit and divert current around said first and second parts to solidify and anneal the weld.

14. In an apparatus for welding together a first and second member wherein the second member is supported in a base, the improvement to which comprises:

first and second spaced electrodes for holding a first member;

means for advancing the first and second electrodes toward the base to engage the first member and the second electrode with the second member;

means applying electric current through the electrodes and two members for melting the first member to further advance the first electrode a predetermined distance toward the second electrode and the second member; and means interposed between said first and second electrodes for engaging the first electrode with the second electrode after the predetermined advance to divert part of the current away from the juncture of the weld and through the electrodes to reduce the temperature of the weld and thereupon anneal the weld.

References Cited

UNITED STATES PATENTS

| | | | |
|---|---|---|---|
| 2,784,300 | 3/1957 | Zuk | 219—107 XR |
| 1,602,682 | 10/1926 | Kochendorfer. | |
| 2,494,847 | 1/1950 | Welch. | |
| 3,036,198 | 5/1962 | Grimland et al. | |
| 1,252,144 | 1/1918 | Murray et al. | 219—108 |
| 1,267,481 | 5/1918 | Von Henke | 219—110 |

JOSEPH V. TRUHE, Primary Examiner

C. CHADD, Assistant Examiner

U.S. Cl. X.R.

219—78, 107